Figure 3:
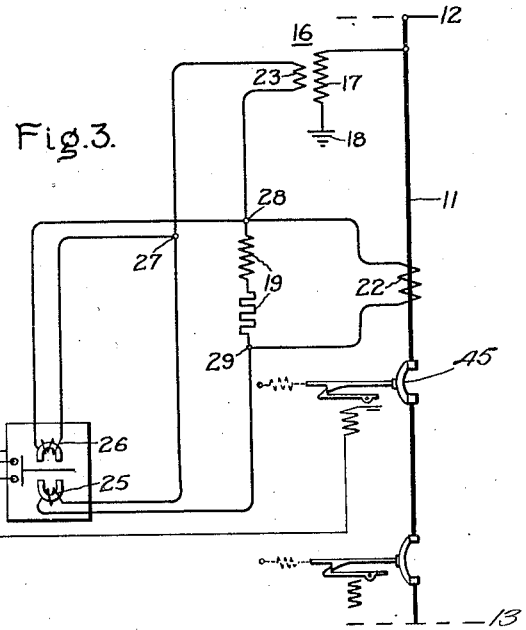

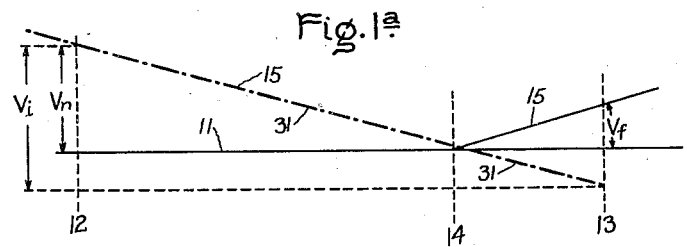
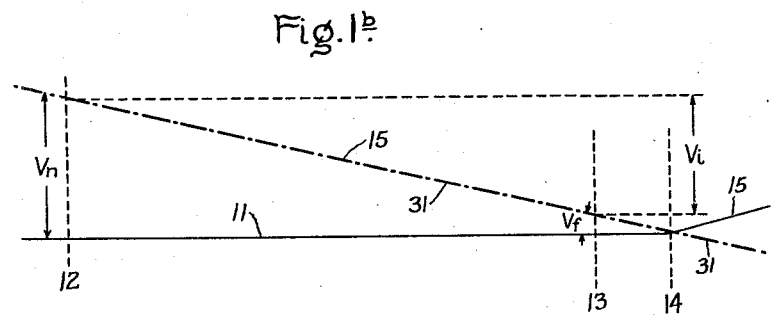
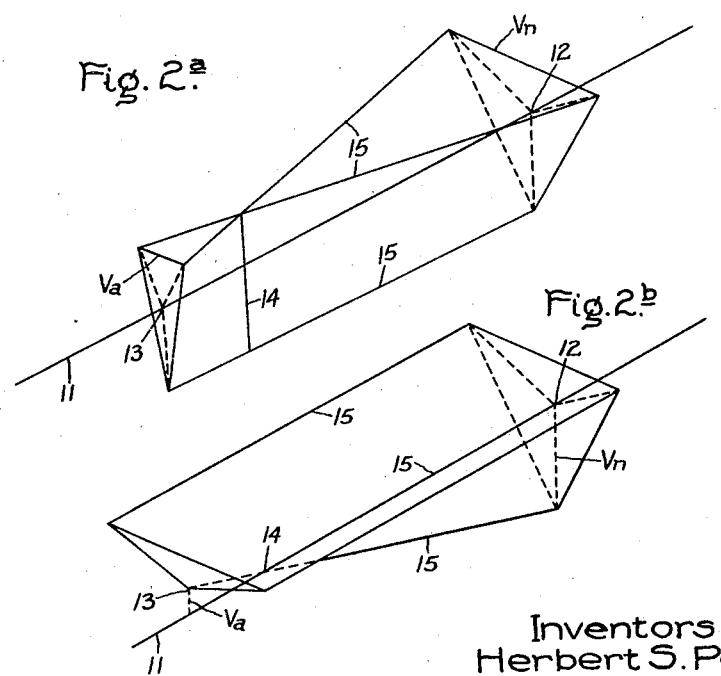

May 27, 1930.   H. S. PETCH ET AL   1,760,521
PROTECTIVE ARRANGEMENT
Filed June 21, 1926   5 Sheets-Sheet 2

Inventors:
Herbert S. Petch,
Edward L. E. Wheatcroft,
by
Their Attorney.

Inventors:
Herbert S. Petch,
Edward L. E. Wheatcroft,
by
Their Attorney.

Patented May 27, 1930

1,760,521

UNITED STATES PATENT OFFICE

HERBERT STANLEY PETCH, OF LONDON, AND EDWARD L. E. WHEATCROFT, OF CAMBRIDGE, ENGLAND, ASSIGNORS TO GENERAL ELECTRIC COMPANY, A CORPORATION OF NEW YORK

PROTECTIVE ARRANGEMENT

Application filed June 21, 1926, Serial No. 117,630, and in Great Britain June 26, 1925.

Our invention relates to improvements in protective arrangements for A. C. or D. C. electric circuits, for instance, feeders, interconnectors or the like, or electric apparatus, whereby a faulty portion or section of an electric circuit can be disconnected selectively without interrupting continuity of service on the remainder of the circuit.

Our invention comprises the use of an impedance or resistance which is adapted to produce a potential drop which varies directly with that in the protected section. In the protection of an A. C. section the impedance may be of the type commonly used in connection with voltage regulating systems and preferably consists of a resistance and an inductance which are respectively proportioned to those of the protected section. A capacitance corresponding to the capacity of the protected section may be added, if necessary. The impedance is preferably energized by being connected to the secondary winding of a current transformer the primary winding of which is excited responsively to the current in the protected section. Other methods of connecting the impedance, so that it will produce the required voltage drop, are, however, known. In the case of D. C. circuits the impedance is a resistance, and the necessary resistance may be supplied by a shunt in the main circuit.

We propose that operation shall be effected (i. e. that the protected section shall be tripped or that a signal shall be given) in response to a fault on the protected section through the interaction of two voltages, when one of them reverses, which are obtained without the use of pilot wires by means of the impedance or resistance which is adapted to produce a potential drop equivalent to that in the protected section.

A further feature of our invention consists in an arrangement for single phase A. C. or D. C. protection comprising an impedance or resistance, adapted to carry a fixed percentage of the current and of such value as to produce a potential drop which varies directly with that in the protected section in normal conditions, and a protective relay of the wattmeter pattern or the equivalent the operation of which depends upon the interaction of a voltage proportional to that at the end where the relay is arranged (hereinafter referred to as the near end) with a voltage equal to the "apparent" voltage at the far end, as obtained from the impedance or resistance, that is, the vectorial difference between the voltage at the near end and the potential drop in the impedance or resistance. This "apparent" voltage is proportional to the voltage at the far end when there is no fault on the protected section. In fault conditions it is proportional to the voltage which would obtain at the far end if there were no fault in the section although it were called upon to carry the fault current.

In A. C. protection a potential transformer is preferably arranged at one end of the protected section and its secondary winding is connected in series with the impedance which is energized from the secondary winding of a current transformer the primary of which is connected to the section to be protected.

However the impedance or resistance be energized, by suitable connections the requisite voltages may be taken from its two ends to the two windings of a protective relay or the equivalent which can be arranged to operate a tripping circuit or the equivalent for the protected section only when one of the voltages reverses, which can only occur with a fault in the section.

In applying our invention to the protection of a three-phase circuit or apparatus, the general principles outlined above will apply, but the voltages which interact in the relay should be proportional to the "apparent" voltages at the far end of the protected section, as obtained from the impedances.

Another feature of our invention consists in an arrangement for protecting a three-phase electric circuit or apparatus which comprises an impedance per phase adapted to carry a fixed percentage of the current of the phase and of such a value as to produce a potential drop which varies directly with that in the phase of the protected section, and a protective relay or the equivalent per phase the operation of which depends upon the interaction of a voltage proportional to the "apparent" voltage at the far end between the phase and earth with a voltage proportional to the "apparent" voltage between the other two phases at the far end.

Our invention will be better understood from the following description taken in connection with the accompanying drawings and its scope will be pointed out in the appended claims.

Figure 4:
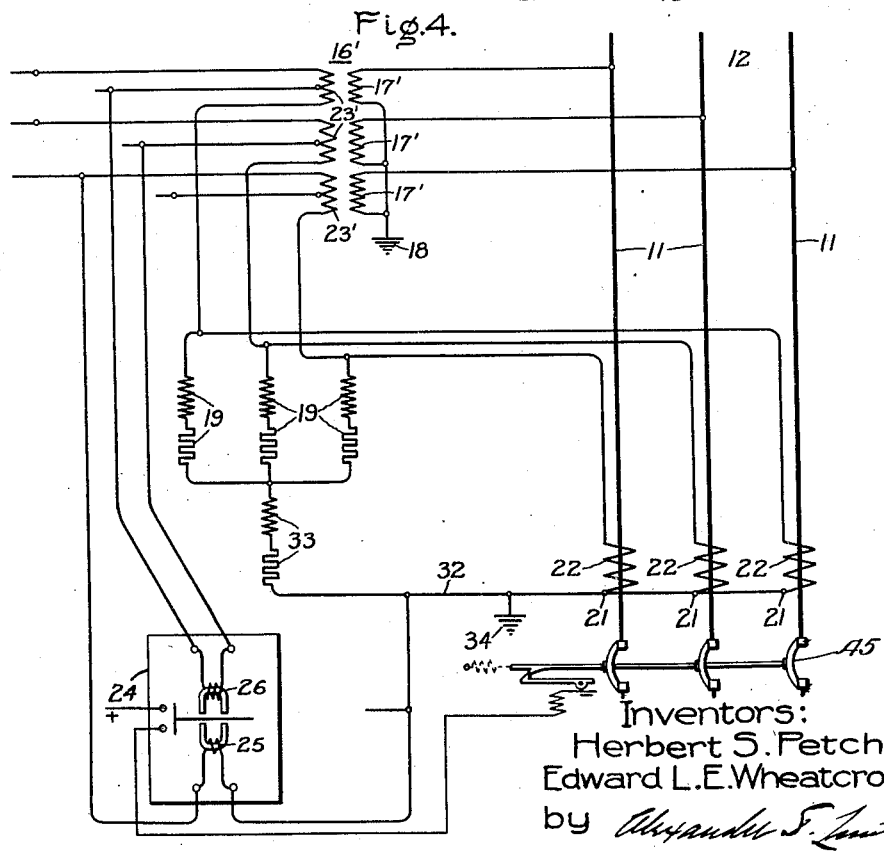
Figure 5:
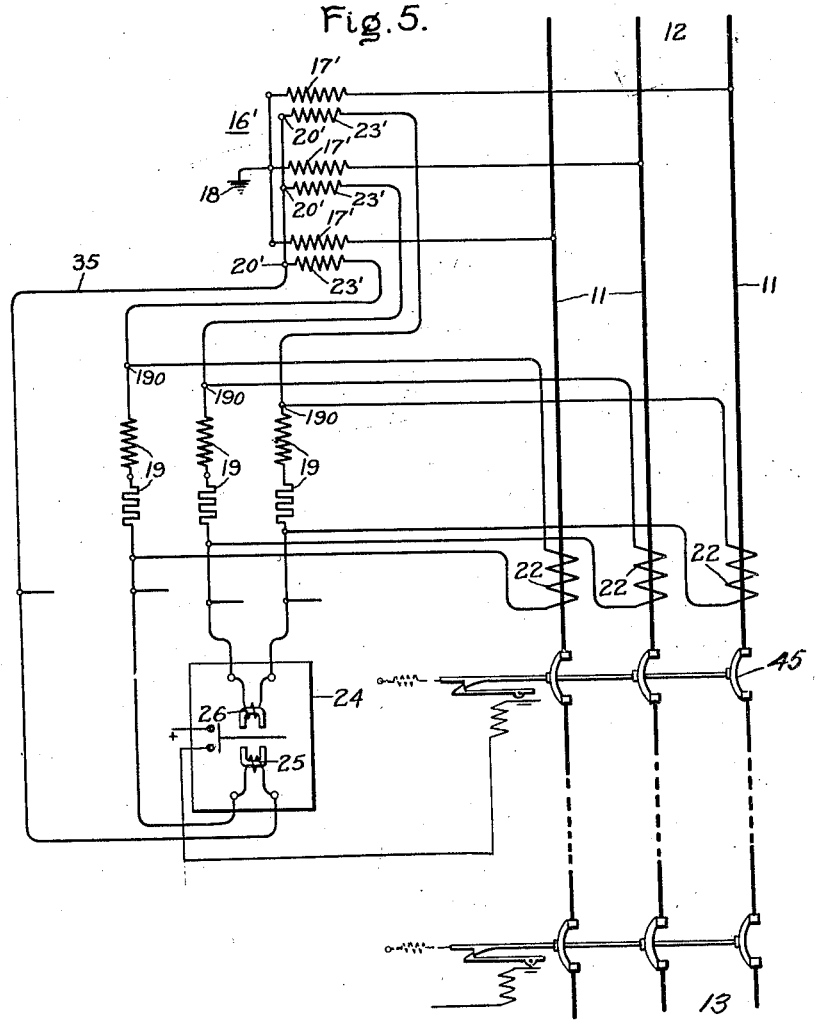
Figure 6:
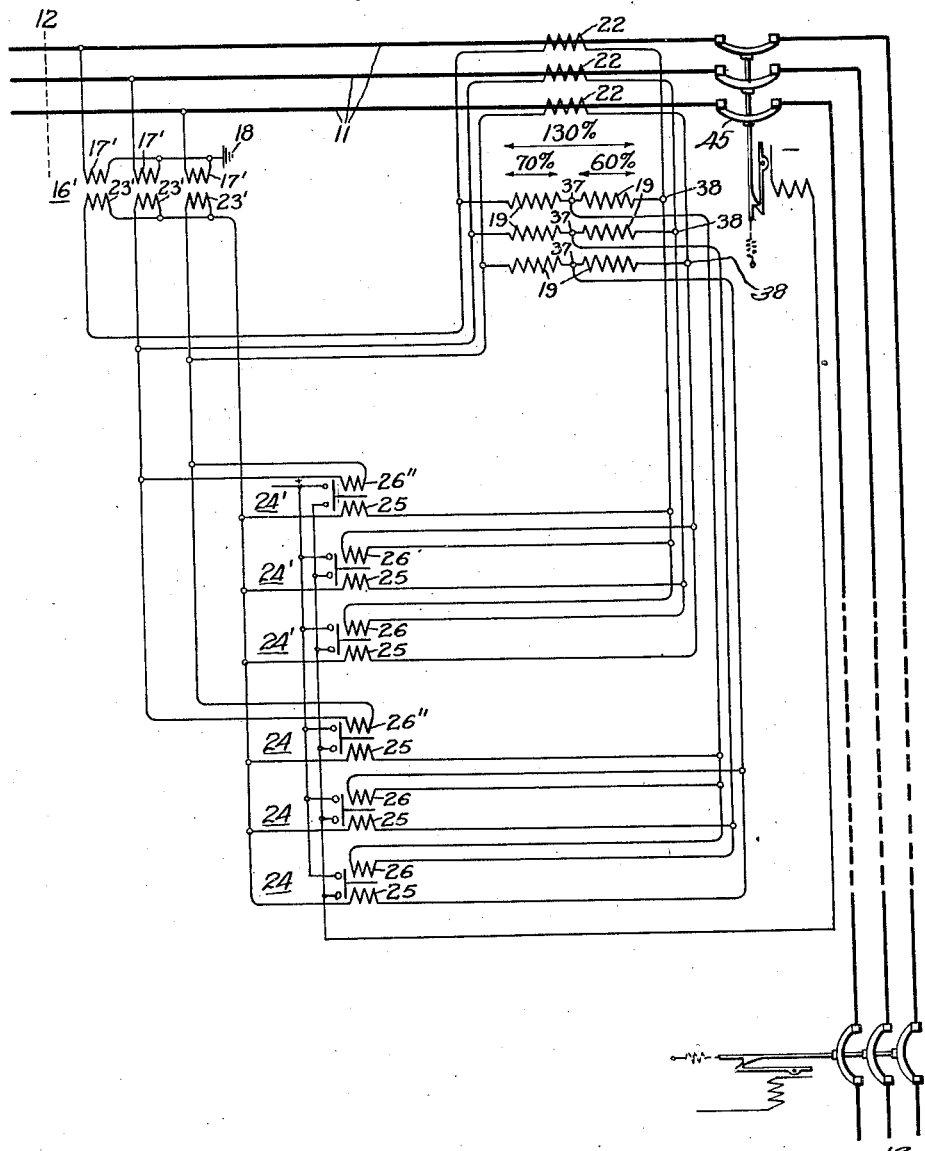
Figure 7:
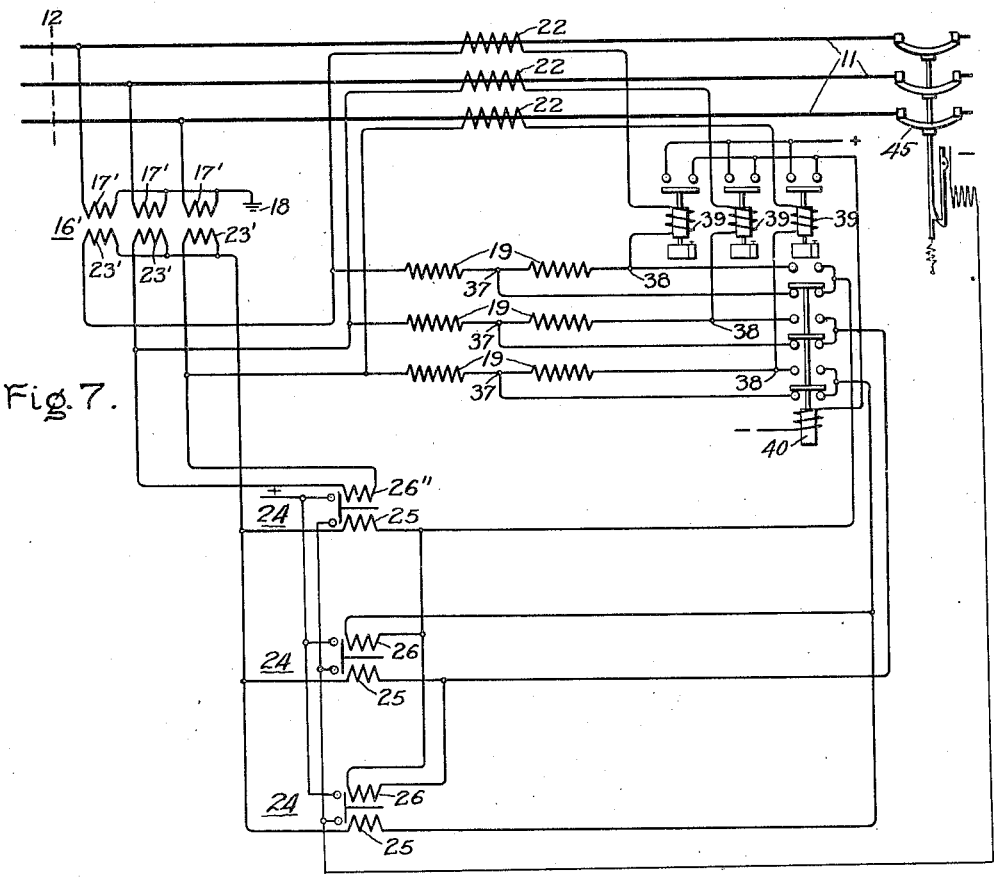
Figure 8:
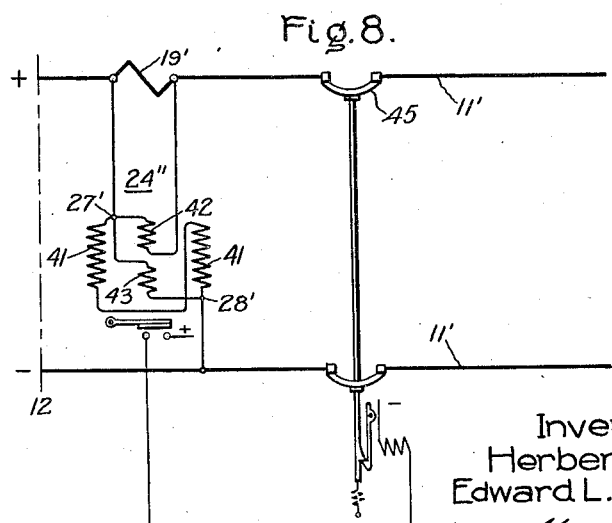

In the accompanying drawings, Figs. 1ª and 1ᵇ each represent a single circuit and the corresponding voltage gradient thereof for different assumed faults; Fig. 2ª and 2ᵇ represent the voltage gradients in the impedances for a three-phase circuit in the case of an interphase fault, that is, between two phase conductors, and an earth-fault, that is between one phase conductor and earth, respectively; Fig. 3 is a diagram showing an arrangement for protecting a single A. C. line according to our invention; Figs. 4 and 5 are diagrams showing alternative connections and arrangements for protecting a three-phase circuit according to our invention; Fig. 6 shows diagrammatically another three-phase circuit protective arrangement with a time limit feature embodying our invention; Fig. 7 shows diagrammatically a modification of the embodiment of our invention shown in Fig. 6; Fig. 8 shows diagrammatically the application of our invention to D. C. protection.

In Figs. 1ª and 1ᵇ, the protected section of the circuit 11 is represented by the near and far ends, 12 and 13, respectively, and 14 indicates the position of an assumed fault. The voltage gradient is indicated by the lines 15.

In Fig. 2ª, the voltages at the near end 12 are symmetrical, at the fault 14 the interphase voltage between the two faulty phase conductors is zero, and at the far end 13 the "apparent" voltage $V_a$ between the two faulty phase conductors is of opposite sign to the voltage $V_n$ at the near end. In Fig. 2ᵇ, the actual and "apparent" phase conductor to earth voltages for the faulty phase $V_n$ and $V_a$ at the near and far ends 12 and 13, respectively, are of opposite sign.

Referring now to Fig. 3, there is shown a potential transformer 16 connected to the circuit 11 to be protected and having its primary winding 17 earthed, as at 18. The impedance 19 is of a value equal or proportional to that of the protected section, and is here shown as comprising only inductance and resistance. The impedance 19 is arranged to be energized proportionally to the protected circuit, as by means of a current transformer whose secondary winding 22 is connected across the impedance 19. The secondary winding 23 of the potential transformer 16 is connected at one end to the impedance 19. Any suitable type of protective relay 24 herein illustrated diagrammatically as a wattmeter type of induction relay having cooperating windings 25 and 26, may be used, operation being effected when the current in either winding reverses. The winding 26 is here connected across points 27 and 28 and the winding 25 across points 27 and 29. The winding 26 is, therefore, energized in accordance with the voltage at the near end 12. The winding 25 is energized in accordance with the "apparent" voltage at the other or far end 13 of the section, that is, to the vectorial difference between the voltage at the near end and the potential drop in the impedance 19. If there is no fault on the circuit 11 this "apparent" voltage is proportional to the voltage at the far end. In the case of a fault on the protected section, it represents the voltage which would obtain at the far end if the section itself were faultless but carrying the fault current. The dash and dot lines 31 in the Figs. 1ª and 1ᵇ show the potential drop in the impedance 19 when there is a fault in the protected section and beyond it respectively. If $V_n$ is the voltage at the near end, $V_f$ that at the far end, and $V_i$ the drop in the impedance it will readily be understood that, when the fault is in the protected section, as in Fig. 1ª, the "apparent" voltage is $V_n-V_i$, that $V_n$ is less than $V_i$, and that, therefore $V_n-V_i$ equals $-V_f$ and is of opposite sign to $V_n$. When the fault is outside the protected section, as in Fig. 1ᵇ the "apparent" voltage, $V_n-V_i$, is equal to $V_f$, and is of the same sign as $V_n$. Consequently so long as the protected section 12, 13 is healthy, the windings 25 and 26 will be energized without effecting operation of the relay 24, but so soon as the section becomes faulty, the current in one of the windings 25, 26 is reversed with respect to that in the other and the relay operates to effect the opening of the circuit breaker 45.

In the arrangement shown in Fig. 4 for the protection of a three-phase electric circuit 11 at the near end 12 of the protected section, there is arranged a potential transformer 16′ having its primary windings 17′ connected in star to the voltages of the phases, respectively, and earthed as at 18, impedances 19 proportional, respectively, to those of the phases and current transformers having their primary windings energized in accordance with the currents in the respective phase conductors. One set of ends 21 of the secondary windings 22 of the current transformers is end connected to one set of ends of the impedances 19 by the conductor 32 and the other sets of ends of the star connected secondary windings 22 and the impedances 19 are directly connected as shown. One set of ends of the secondary windings 23′ of the potential transformer 16′ is individually connected to the second set of ends of the impedances 19. Protective relays 24 or the equivalent (of which only one is here shown for simplicity), at the rate of one per phase and each having two cooperating windings 25 and 26, are connected so that one of the windings 25 joins the other end of one of the potential transformer secondary windings 23' to the end connection 32 of the current transformer secondary windings 22, while the other winding 26 is connected between the other ends of taps of the two other secondary windings 23' of the potential transformer 16'. This method of connection has the advantage that an additional impedance 33 may be connected between the first set of ends of the impedances 19 and the end connection 32 of the current transformer secondaries 22. By this means the reduction of the "apparent" voltage occasioned by an earth fault may be made greater than the corresponding reduction due to a phase fault of similar magnitude. The end connection 32 of the current transformer secondaries 22 is preferably earthed as at 34.

The arrangement for effecting the protection of a three-phase electric circuit 11 shown in Fig. 5 comprises a potential transformer 16' at the near end 12 having its primary windings 17' star-connected, respectively to the phase voltages and earthed as at 18, current transformers having secondary windings 22 and their primary windings energized in accordance with the currents in the phases, respectively, impedances 19 proportional to those of the phases, and wattmeter relays 24 having two windings 25 and 26, just as in Fig. 4.

The secondary windings 22 of the current transformers are, however, connected respectively across the impedances 19 and one set of ends 20' of the secondary windings 23' of the potential transformer 16' is end-connected by the line 35 and the other set is connected individually to one set of ends 190 of the impedances 19, while one of the windings 25 of each protective relay 24 (only one is shown) is connected between the other end of one of the impedances and the end connection 35 of the potential transformer secondary windings and the other winding 26 is connected between the other ends of the two other impedances 19.

In both of these arrangements, one winding 25 of each relay is energized in accordance with the "apparent" voltage between a phase and earth at the far end and the other winding 26 in accordance with the "apparent" voltage at the far end between the two remaining phases. When there is no fault, the voltages are approximately 90° out-of-phase but, in cases of fault, 270° out-of-phase, as will easily be seen from Figs. 2ᵃ and 2ᵇ.

In order to provide desirable tripping characteristics in all circumstances it may be necessary to excite the interphase winding 26 of each protective relay by tappings from the secondary windings 23' of the potential transformer 16' as shown in Fig. 4. These tappings, or other tappings, may be used in connecting the impedances thereto.

The arrangements described in connection with three-phase circuits will operate in all cases of an earth fault or in an interphase fault, except that of a three-phase short-circuit in which all the phases are involved, as might occur in the protection of an underground three-phase cable. To offer protection in this case, also, a fourth relay may be used, the same being connected as described above in Fig. 3 in connection with single phase protection. This relay may be an extremely sensitive one to ensure operation in cases of severe interphase short-circuit when the voltages are very low. This fourth relay is not necessary if one of the three relays, described in connection with Figs. 4 and 5, has its windings connected, respectively, to receive the "apparent" voltage to earth at the far end and the interphase voltage at the near end, the other two relays being connected as before described.

Arrangements according to our invention can obviously be used in the protection of other polyphase circuits or apparatus.

Furthermore, the arrangements described may be provided at both ends of a section to be protected in order to ensure complete isolation when both ends of the section are connected to a source of power. The arrangements are inherently directional, that is to say, no operation is effected in the event of a fault outside the protected circuit no matter in which direction the faulty power may flow.

In order to ensure that operation is effected in case of a fault occurring at, or very near, the far end of the protected section (in which case the voltage at the far end is zero or very small), we prefer to "over-compound" the impedance, that is to say, to arrange it so that it produces a potential drop which appears to be slightly greater than that in the protected section with respect to its effect on the voltages applied to the protective relay. Such an arrangement ensures operation in the case when a fault occurs exactly at the far end, as one of the two interacting "apparent" voltages is now reversed instead of being zero, but on the other hand, if the fault should happen just beyond the far end of the protected section, operation would in this case also be effected. To prevent this unwanted operation, we propose to combine with each protective relay a means of applying bias, or a time limit device, whereby in the case assumed, operation would be delayed in the section which had not actually sustained the fault until operation had been effected in the next section beyond the far end, where one of the voltages would be heavily reversed. The time limit, which may be inversely dependent upon the voltage, may be introduced in any well known way, as by making the protective relays in the form of induction disc relays. The bias may be introduced in any suitable manner as by the use of one or more "biasing" transformers of the kind disclosed in Letters Patent of the United States, 1,468,441, issued September 18, 1923, and 1,560,934, issued November 10, 1925, to Alan S. Fitzgerald and assigned to the same assignee as this invention.

A preferred arrangement for protecting a three-phase circuit against all possible kinds of faults is indicated diagrammatically in Fig. 6. The impedances 19 are over-compounded, that is to say, they are arranged to produce potential drops equal, say, to 130% of the drops in their respective phase conductors. Tappings are taken from the points 37 representing 70% of the impedances to the relays 24, which are instantaneous relays. Other tappings are taken from 38 at the ends of the impedances to a second set of relays 24', which are substantially similar to the relays 24 except that they operate with a definite time limit of, say, half a second. One of the windings 26 of one of the relays of each set is shown as being energized by the interphase voltage at the near end instead of by the "apparent" interphase voltage at the far end. These windings are designated by the reference numeral 26''. It is believed that the operation of this arrangement will be apparent from what has been stated above, instantaneous protection being afforded by the relays 24 for faults in the first 60% of the section, while, in the case of faults on the remainder of the section, delayed protection will be offered by the relays 24', each of the relays 24, 24' being arranged to control for example the trip circuit of suitable circuit controlling means such as a circuit breaker 45 at the near end 12 of the section. If the fault is just beyond the far end, the relays 24 will naturally not operate. The relays 24' would operate, but before this is effected the relays 24 of the next section will have operated.

Fig. 7 illustrates a modification of the arrangement illustrated in Fig. 6, using only one set of relays 24, but the connection of their windings to the tapping points 37 or 38 is controlled by suitable time limit relays 39, which operate in response to fault conditions such as excess current after a predetermined interval to shift the connections of the windings 25 and 26 from one set of tapping points to the other. The relays 39 may be arranged to control an auxiliary relay 40 which under normal conditions is in the position shown and connects the windings 25 and 26 of the relays 24 to the tapping points 37. If a fault occurs in the first 60% of the feeder section operation of the relays 24 will occur substantially instantaneously. If, however, the fault occurs on the remaining portion of the feeder section after the predetermined interval of the time limit relays 39 the relay 40 will be energized, thereby switching over the windings 25 and 26 of the relays 24 to the tappings 38 and operation of the relays 24 will then be effected immediately. If the fault should be only just beyond the feeder, before the time limit relays 39 can operate to connect the windings of relays 24 to the tapping points 38, the protective devices of the next following section will have operated instantaneously, thus cutting out the faulty section before the healthy sections have been cut out.

In the arrangement illustrated diagrammatically in Fig. 8 for protecting a D. C. circuit, the impedance takes the form of a shunt 19' connected in the main circuit 11' and the relay 24'' is a polarized relay having polarizing windings 41 connected in series across points 27' and 28' so as to be energized by the voltage of the circuit at the near end 12. In addition, it has a second coil comprising two operating windings 42 and 43 which are energized responsively to the voltage drop across the impedance 19' and to the voltage of the circuit 11', respectively. In normal conditions the current in the winding 43 is greater than that in the winding 42. In fault conditions, however, the current in the winding 42 becomes greater than that in the winding 43 and consequently the combined effect of the coils 42 and 43 is reversed with respect to the effect of the polarizing coils 41 in fault conditions, and the relay operates.

While we have shown and described several embodiments of our invention, we do not desire to be limited to the exact arrangements shown and described but seek to cover in the appended claims all those modifications that fall within the true spirit and scope of our invention.

What we claim as new and desire to secure by Letters Patent of the United States, is:—

1. A protective arrangement for an electric circuit including an impedance connected and arranged to be energized in accordance with the current of the circuit and proportioned to produce a potential drop which varies in accordance with the potential drop in a section of the circuit, and a relay having a winding connected to be energized in accordance with the difference between the potential drop across the impedance and a potential of the circuit and a cooperating winding connected to be energized in accordance with a potential of the circuit.

2. A protective arrangement for an electric circuit including a relay having a winding connected to be energized in accordance with the difference between a potential of the circuit and a potential drop dependent on the current in the circuit and proportional to the impedance of a portion of the circuit, and a cooperating winding connected to be energized in accordance with a potential of the circuit.

3. A protective arrangement for a section of a three phase electric circuit including a relay at one end of the section having a winding connected and arranged to be energized in accordance with the "apparent" potential at the other end of the section between a phase conductor and ground and a cooperating winding connected and arranged to be energized in accordance with the "apparent" potential at the other end between the remaining phase conductors.

4. A protective arrangement for a section of a three phase electric circuit including a plurality of impedances at one end of the section, one for each phase, connected and arranged to be energized in accordance with the currents in the respective phase conductors and proportioned to produce a potential drop which varies in accordance with the potential drop in a section of the circuit, and a relay at said end including two cooperating windings, said windings and impedances being so connected and arranged that operation of the relay is dependent on the "apparent" potential at the other end of the section between a phase conductor and earth and the "apparent" potential at the other end between the remaining phase conductors.

5. A protective arrangement for a three phase electric circuit including a potential transformer having its primary windings star-connected to the phase conductors of the circuit and earthed, impedances respectively proportional to the impedances of the phase conductors, current transformers connected to be energized respectively in accordance with the currents in the phase conductors, said impedances being connected respectively across the secondary windings of the current transformers and the secondary windings of the potential transformer being end-connected and connected individually to one set of ends of the impedances, and a protective relay having a winding connected between the other end of one of the impedances and the end connection of the potential transformer secondary windings and a cooperating winding connected between the other ends of the two other impedances.

6. A protective arrangement for a three phase electric circuit including a potential transformer having its primary windings star-connected to the phase conductors of the circuit and earthed, impedances respectively proportional to the impedances of the phase conductors, current transformers connected to be energized respectively in accordance with the currents in the phase conductors, said impedances being connected respectively across the secondary windings of the current transformers and the secondary windings of the potential transformer being end-connected and connected individually to one set of ends of the impedances, and a protective relay having a winding connected between the other end of one of the impedances and the end-connection of the potential transformer secondary windings and a cooperating winding connected to be energized in accordance with the potential at the relay location between two of the phase conductors.

7. A protective arrangement for a section of an electric circuit including a relay having a plurality of windings, impedance means the resistance and reactance of which are proportional to the resistance and reactance of the section of the circuit to be protected, means for supplying to said impedance means a current proportional to the current in a conductor of said section, means for energizing a winding of the relay in accordance with a potential of said circuit at one end of the section, and connections for energizing another winding of the relay in accordance with the difference between said potential and the potential drop in the impedance means.

8. A protective arrangement for a sectionalized electric circuit including a relay having a plurality of windings, means for energizing one winding of the relay in accordance with a potential of the circuit at the near end of one section, impedance means the resistance and reactance of which bear a definite ratio to the resistance and reactance of said circuit section, means for supplying to the impedance means a current proportional to the current of said circuit, connections for energizing another relay in accordance with the difference between the potential at the near end of said section and the potential drop in a portion of said impedance means and a relay having a winding energized in accordance with the potential at the near end of the section and a winding energized in accordance with the difference between the potential at the near end and the potential drop in a larger portion of the impedance means.

9. A protective arrangement for a section of a three phase electric circuit including a relay having two cooperating windings and means for energizing one of said windings in accordance with the "apparent" voltage at an intermediate point of the section between a phase conductor and ground, and the other winding in accordance with the "apparent" voltage at the intermediate point between the other two phase conductors, a time limit relay having two cooperating windings, and means for energizing one of said windings in accordance with the "apparent" voltage beyond the far end of the section between a phase conductor and earth and the other of said windings in accordance with the "apparent" voltage beyond the far end of the section between the other two phase conductors.

10. A protective arrangement for a three phase electric circuit including a potential transformer connected to be energized from the circuit, impedances respectively proportional to the impedances of the phase conductors of a section of the circuit connected to be energized respectively in accordance with the currents in the phase conductors, the secondaries of the potential transformer being end-connected and connected individually to one set of ends of the impedances, a time limit relay having a winding connected between the other end of one of the impendances and the end connection of the potential transformer secondaries and a cooperating winding connected between the other ends of the two other impedances, and a substantially instantaneous relay having a winding connected between an intermediate point of one of the impedances and the end connection of the potential transformer secondaries, and a cooperating winding connected between intermediate points of the two other impedances.

11. A protective arrangement for an electric circuit including impedance means connected and arranged to be energized in accordance with the current of the circuit and proportioned to produce a potential drop which varies in accordance with the potential drop in a section of the circuit and electroresponsive means having cooperating windings connected and arranged to produce an effect dependent on the product of a potential of the circuit and the difference between said circuit potential and the potential across said impedance means.

In witness whereof, I, one of the above-named joint inventors, have hereunto set my hand this 28th day of May, 1926.

HERBERT STANLEY PETCH.

In witness whereof, I, one of the above-named joint inventors, have hereunto set my hand this 20th day of May, 1926.

EDWARD L. E. WHEATCROFT.